Patented Jan. 2, 1934

1,941,709

UNITED STATES PATENT OFFICE 1,941,709

METHOD OF COATING AND PRODUCT THEREOF

William Henry Moss, Cumberland, Md., assignor to Celanese Corporation of America, a corporation of Delaware No Drawing. Application March 20, 1929
Serial No. 348,667

9 Claims. (Cl. 91—68)

This invention relates to the coating of surfaces with lacquers containing derivatives of cellulose and relates more particularly to the application of a primer coat or filler coat to such surfaces prior to the application of the lacquer.

An object of my invention is to prepare a suitable filler or primer for the coating of surfaces that are not smooth in order to prepare the same for the application of lacquers containing derivatives of cellulose. Other objects of my invention will appear from the following detailed description.

In the application of lacquers to rough or porous surfaces, such as wood, it is first necessary to apply a filler or primer coat to the same. The ordinary filler, which comprises a coating composition containing drying oils and natural resins, is not suitable for use when lacquers containing organic derivatives of cellulose are to be applied, since the films formed from such lacquers do not adhere well to the filler or primer coat of the above composition. The same is true of shellac or other fillers of this nature.

I have found that if a substance is used as a filler, which substance may be in the form of a paste or a freely flowing solution, and which contains a substantial proportion of a plastifier for the derivative of cellulose employed in the lacquer to be applied, very satisfactory results are obtained.

In accordance with my invention I coat a surface that is not smooth with a filler or primer coat containing a plastifier for the derivative of cellulose contained in the lacquer to be applied. This filler or priming coat may contain suitable volatile solvents for the plastifier and pigments if desired, and also may contain a quantity of synthetic resin that is compatible with the derivative of cellulose that is employed in the lacquer subsequently to be applied. This filler or priming coat may be in the form of a freely flowing liquid, or it may be in the form of a paste. This filler preferably contains little or no derivative of cellulose.

The surfaces to be coated in accordance with my invention are preferably such surfaces that require the application of primer or filler coat. Such surfaces may be of either hard or soft wood, ceramic material such as pottery, china or brick, stoneware, concrete or even metallic surfaces that are not smooth. These surfaces may first be stained to a desired color if desired. The articles to be treated may be any suitable ones such as furniture, walls, receptacles, machines, vehicles, etc.

The filler or primer material in accordance with my invention may be applied in any suitable manner. Thus if it is in the form of a paste, it may be applied by rubbing the same onto the surfaces or by pressing the same onto such surfaces as desired. If it is in the form of a liquid, it may be applied by brushing, spraying, dipping or in any other suitable manner.

The plastifiers employed in making the primer in accordance with this invention may be any suitable ones such as camphor, triacetin, diethyl phthalate, dibutyl phthalate, diethyl tartrate, dibutyl tartrate, monomethyl xylene sulfonamide, the ethyl toluene sulfonamids (meta, ortho or para), etc.

If desired, any suitable pigment or mineral filling material may be added, examples of which are lamp-black, china clay or the other pigments used in making paint. As stated, synthetic resins compatible with the derivatives of cellulose employed in the lacquer to be applied, as described below, may be added, but preferably the amount of such resin employed is small in order to avoid difficulties in subsequent drying.

The plastifiers and the other ingredients are dissolved in such quantities of volatile solvent or diluent to form a paste or a freely flowing solution as is desired. Any suitable volatile solvent may be employed, examples of which are benzene, acetone, toluene, xylene, or mixtures of these etc. The specific solvent chosen will depend on the nature of the material employed.

After application of the primer or filler in accordance with my invention, a suitable lacquer containing a derivative of cellulose may then be applied. This lacquer may contain any suitable derivative of cellulose, a synthetic resin compatible with the derivative of cellulose, plastifiers, and suitable solvents. The derivative of cellulose employed may be an inorganic derivative of cellulose such as cellulose nitrate or an organic derivative of cellulose such as organic esters of cellulose or cellulose ethers. Examples of organic esters of cellulose are cellulose acetate, cellulose formate, cellulose propionate and cellulose butyrate while examples of cellulose ethers are ethyl cellulose, methyl cellulose and benzyl cellulose. Examples of synthetic resins that may be employed are the fusible and soluble phenol formaldehyde resins prepared in the presence of an acid catalyst, diphenylol propane formaldehyde resins, toluene sulfonamide-formaldehyde resins, etc. The plastifiers employed in making the lacquer may be any suitable ones such as those described above. The solvent mixture preferably contains low boiling solvents such as acetone, alcohol, benzene, etc., medium boiling solvents such as dioxan, monomethyl ether of ethylene glycol or ethyl lactate, and high boiling solvents such as diacetone alcohol, benzyl alcohol, etc.

After the filler is applied to the surfaces, and allowed to dry for sufficient period, which will vary with the nature and amount of volatile solvent employed, all pores or grains of the surfaces are well filled, and after the lacquer is applied, a smooth satisfactory film is formed.

In order further to illustrate my invention but without being limited thereto, the following specific examples are given.

Example I

The following is an example of a suitable primer or filler which may be applied by brushing or spraying.

| | Parts by weight |
|---|---|
| Plastifier | 20 |
| Xylene | 50 |
| Carbon black | 5 |

The plastifier may be ethyl-meta-toluene-sulfonamide, diethyl phthalate or dibutyl tartrate.

After the application of the filler above described, a suitable lacquer may be employed, and an example of such lacquer is as follows:

Example A

| | Parts by weight |
|---|---|
| Cellulose acetate | 50 |
| Diphenyl propane formaldehyde resin | 50 |
| Acetone | 250 |
| Benzene | 100 |
| Alcohol | 120 |
| Ethyl lactate | 50 |

If desired, a softener or plastifier such as diethyl phthalate may be added in suitable proportions, say 10 parts by weight. Pigments may also be added in suitable proportions, examples of suitable proportions being 15 parts by weight of pigments such as burnt umber or prussian blue.

The term "compatible" as used in the specification and hereinafter in the claims is to be construed to mean that the resin and the derivative of cellulose should be soluble in a common solvent or mixtures of solvents to form clear, homogeneous solutions, which solutions, upon evaporation, form clear, homogeneous films from which the resin or derivative of cellulose is not precipitated.

It is to be understood that the foregoing detailed description is given merely by way of illustration, and that many variations may be made therein without departing from the spirit of my invention.

Having described my invention what I claim and desire to secure by Letters Patent is:

1. In a method of coating surfaces with lacquers containing derivatives of cellulose, the step of applying to such surfaces a primer in which the major non-volatile constituent is a non-resinous substance capable of inducing plasticity in the cellulose derivative.

2. In a method of coating surfaces with lacquers containing cellulose acetate, the step of applying to such surfaces a primer in which the major non-volatile constituent is a non-resinous substance capable of inducing plasticity in the cellulose acetate.

3. The method of coating surfaces comprising applying a primer to said surfaces and then applying a lacquer containing a derivative of cellulose, said primer being of a composition in which the major non-volatile constituent is a non-resinous substance capable of inducing plasticity in the cellulose derivative.

4. The method of coating surfaces which comprises applying a primer to said surfaces and then applying a lacquer containing an organic derivative of cellulose, said primer being of a composition in which the major non-volatile constituent is a non-resinous substance capable of inducing plasticity in the organic derivative of cellulose.

5. The method of coating surfaces which comprises applying a primer to said surfaces and then applying a lacquer containing cellulose acetate, said primer being of a composition in which the major non-volatile constituent is a non-resinous substance capable of inducing plasticity in the cellulose acetate.

6. The method of coating wood surfaces which comprises applying a primer to said surfaces and then applying a lacquer containing a derivative of cellulose, said primer being of a composition which is substantially free from derivatives of cellulose and in which the major non-volatile constituent is a non-resinous substance capable of inducing plasticity in said cellulose derivative.

7. The method of coating wood surfaces which comprises applying a primer to said surface and then applying a lacquer containing cellulose acetate, said primer being of a composition which is substantially free from cellulose acetate and in which the major non-volatile constituent is a non-resinous substance capable of inducing plasticity in said cellulose acetate.

8. An article of manufacture having at least on part of the surface thereof a coat formed by the application of a primer and a film formed from a lacquer containing a derivative of cellulose superposed thereon, said primer being of a composition in which the major non-volatile constituent is a non-resinous substance capable of inducing plasticity in said cellulose derivative.

9. An article of manufacture having at least on part of the surface thereof a coat formed by the application of a primer and a film formed from a lacquer containing cellulose acetate superposed thereon, said primer being of a composition in which the major non-volatile constituent is a non-resinous substance capable of inducing plasticity in said cellulose acetate.

WILLIAM HENRY MOSS.